US006488996B1

(12) United States Patent
Ino et al.

(10) Patent No.: US 6,488,996 B1
(45) Date of Patent: Dec. 3, 2002

(54) CUSHION SPACER FOR GLASS PLATES AND STACK OF GLASS PLATES

(75) Inventors: Yasushi Ino; Shingo Teraoka, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/284,198

(22) PCT Filed: Dec. 18, 1998

(86) PCT No.: PCT/JP98/05734

§ 371 (c)(1),
(2), (4) Date: May 11, 1999

(87) PCT Pub. No.: WO99/33757

PCT Pub. Date: Jul. 8, 1999

(30) Foreign Application Priority Data

Dec. 24, 1997  (JP) .............................................. 9-355128

(51) Int. Cl.7 .............................. E06B 3/26; B32B 5/16
(52) U.S. Cl. ......................... 428/34; 428/402; 428/438; 428/326; 52/786.13
(58) Field of Search .......................... 428/34, 426, 438, 428/497, 532, 543, 326, 402, 357; 156/109; 52/786.1, 786.13

(56) References Cited

FOREIGN PATENT DOCUMENTS

| JP | 1-32171 | 6/1989 |
|----|---------|--------|
| JP | 2-40798 | 9/1990 |
| JP | 3-53112 | 8/1991 |
| JP | 4-60933 | 9/1992 |
| JP | 4-79914 | 12/1992 |
| JP | 5-78152 | 3/1993 |
| JP | 5-178636 | 7/1993 |
| JP | 5-339028 | 12/1993 |
| JP | 7-2543 | 1/1995 |
| JP | 9-110458 | 4/1997 |
| JP | 9-175830 | 7/1997 |

*Primary Examiner*—Donald J. Loney
(74) *Attorney, Agent, or Firm*—Kaneska & Takeuchi

(57) ABSTRACT

A cushion spacer is provided, which is made of coconut husk powder, which is washed and dried, and is adjusted such that the moisture content of the powder is 10% by weight or less and the fats and oils content of the powder is 1.0% by weight or less, and that when the powder is interposed between the glass plates, the friction coefficient between the glass plates exceeds 0.24. A stack of glass plates, which is formed by interposing the cushion spacer between the glass plates, is also provided.

13 Claims, No Drawings

CUSHION SPACER FOR GLASS PLATES AND STACK OF GLASS PLATES

TECHNICAL FIELD

The present invention relates to a cushion spacer to be interposed between glass plates and a stack of glass plates having the cushion spacer. More particularly, the present invention relates to the cushion spacer which can efficiently prevent occurrence of deterioration, scratching, and weathering due to contact between stacked glass plates, aging and friction, and which can be easily inserted between the glass plates and easily removed from the glass plates, and the stack of glass plates with using the cushion spacer.

BACKGROUND ART

A cushion spacer for glass plates prevents occurrence of deterioration, scratching, and weathering (discoloring) due to contact between stacked glass plates, long-term storage, and friction by interposing the spacer between the glass plates.

Conventionally known as such a cushion spacer is a spacing sheet paper (Japanese paper made from paper mulberry, so-called SENKASHI paper) (Japanese patent publication JP1-32171B, JP 4-60933B, JP 4-79914B, and JP 2-40798B).

Also known as such a cushion spacer are powders. For example, the following powders have been proposed:

Porous powder (as concrete example, cellulose) (JP 3-53112B);

Cation exchange resin powder (JP 5-78152A);

Globular inorganic powder (from an aluminosilicate and/or other materials) (JP

Chitin and/or chitosan powder (JP 5-339028A);

Zeolite powder (JP 7-2543A); and

Polymethyl methacrylate, polyethylene, polyethylene powder (JP 9-110458A).

Among the conventional cushion spacers as mentioned above, the spacing sheet paper has disadvantages as follows:

i) high cost, because it has to be formed in a predetermined configuration in which area is the same or more than that of the glass plate;

ii) it is difficult to insert the sheet paper between the glass plates, thus making the work complex; and iii) the glass plate becomes dim and/or spot marks are applied on a glass surface, due to the fats and oils of the sheet paper.

The powder cushion spacers have disadvantages as follows:

I. the glass surface is eroded due to the moisture absorbed in the powder so that burning occurs;

II. there is a possibility of the stacked glass plates slipping from each other and/or the powder coming off a space between the glass plates; and III. it is difficult to disperse the powder on the glass plate and also remove the powder from the glass plate.

DISCLOSURE OF THE INVENTION

It is an object of the present invention to solve conventional problems mentioned above and to provide a powder cushion spacer which can efficiently prevent occurrence of deterioration, scratching, and weathering (discoloration) due to contact between stacked glass plates, long-term storage and friction, and which can be easily inserted between the glass plates and easily removed from the glass plates and also provide a glass plate stacked body.

A cushion spacer for glass plates of the present invention is made of coconut husk powder, wherein the coconut husk powder is washed by water and then dried, and wherein the spacer is adjusted such that a moisture content of the powder is 10% by weight or less and a fats and oils content of the powder is 1.0% by weight or less, and that the powder interposed between the glass plates brings the friction coefficient between the glass plates of 0.24 or more.

A stack of glass plates of the present invention is formed by interposing the cushion spacer as mentioned above between the glass plates.

The cushion spacer for glass plates of the present invention holds the friction coefficient between the glass plates at 0.24 or more for a long-term period, thereby securely preventing the glass plates from occurrence of deterioration, scratching, and discoloring (weathering) due to contact and friction between stacked glass plates and preventing the glass plates from slipping from each other during transportation. In addition, the cushion spacer is easily inserted between the glass plates and easily removed from the glass plates.

It is important for ensuring the aforementioned friction coefficient that the coconut husk powder is washed by water and then dried to control the moisture content and the fats and oils content. It is preferable that the coconut husk powder comprises particles passing through a 200-mesh sieve in an amount of 95 wt % or more in order to be scattered, dispersed or spread easily and in order to prevent the powder from falling down from the glass plates.

Preferred Embodiments of the Invention

Hereinafter, an embodiment will be described in detail.

The cushion spacer of the present invention provides a friction coefficient of 0.24 or more between the glass plates when it is interposed between glass plates. In case the friction coefficient is below 0.24, slippage may be caused between the glass plates during transportation whereby causing loads shifting. The friction coefficient between the glass plates is preferably 0.25 or more.

The method of measuring the friction coefficient is as described in the section "Examples" described later.

In case the moisture content of coconut husk powder forming the cushion spacer exceeds 10% by weight, the friction coefficient becomes so small as to cause slippage between the glass plates. There is also a possibility of discoloring the glass plate due to the moisture. The moisture content is preferably 8% or less by weight.

In case the fats and oils content of the coconut husk powder exceeds 1.0% by weight, the friction coefficient is reduced with time and it may cause discoloring and/or stain. The fats and oils content is preferably 0.5% by weight or less.

The coconut husk powder according to the present invention is preferably composed of particles in such a manner that 95 wt % or more of the particles pass through a 200-mesh sieve. Coconut husk powder having larger particle sizes in which only less than 95% of the particles pass through the 200-mesh sieve is not scattered, spread or dispersed suitably on the glass surface. In addition, when the glass plates are stacked vertically with such coconut husk powder interposed therebetween, the coconut husk powder comes off the glass plates thereby losing functions as a spacer.

The coconut husk powder of the present invention has preferably an average particle size between 60 $\mu$m and 120

μm. It is more preferable that 50 wt % or more of the coconut husk powder has a particle size between 50 μm and 130 μm.

Further, the coconut husk powder of the present invention is preferably acid weakly to have pH between 6 and 8 in particular 6 and 7 when measured according to JIS-P8133.

The coconut husk powder as mentioned above may be prepared in such a way that coconut husk powder on the market is degreased by washing with water and then dried to adjust the fats and oils and moisture contents thereof and further to adjust particle sizes thereof. It should be noted that the fats and oils contained in the coconut husk powder are water soluble so that they are removed by washing with water.

The degreasing method for adjusting the fats and oils content of the coconut husk powder is not limited to the water washing and drying, but includes a chemical degreasing method by washing or boiling with normal hexane, ethanol, or neutral detergent, and a physical degreasing method by pressing or the like. In terms of the cost, the water washing and drying is most advantageous.

The drying for adjusting the moisture content of the coconut husk powder is made according to the usual process such as natural drying, heated-air drying, and drying in air wind.

It is also quite important to adjust not only the fats and oils content but also the moisture content of the coconut husk powder into a predetermined range. Even with the same samples of the coconut husk powder, in case the moisture contents are different, the fats and oils contents become different so that the friction coefficient becomes less than 0.24.

Degreasing the powder by drying after water washing makes it possible to adjust the fats and oils and moisture contents of the coconut husk powder thereby setting the friction coefficient to 0.24 or more.

Water washing of the coconut husk powder can be conducted by immersing the coconut husk powder and agitating them. In this case, it is preferable that a weight ratio of water/coconut husk power is 20/1 or more. That is, the ratio of the coconut husk power to water is preferably 5% by weight or more. Hereinafter, the weight percentage of the coconut husk powder to water is referred to as "concentration for water washing". In case the water is less than the above ratio, in other words, the concentration for water washing exceeds 5% by weight, the efficiency of the degreasing is reduced so as not to degrease the coconut husk powder enough. When the concentration for water washing is too low, the efficiency of improving the friction coefficient can not be obtained corresponding to the increase in the amount of water and only the cost is increased. Therefore, the concentration for water washing is preferably 5% by weight or less, particularly between 3 and 5% by weight.

It is preferable to conduct the water washing in such a way that washing time is controlled to obtain a predetermined friction coefficient and that the water washing is repeated at a plurality of times as necessary.

The stack of glass plates according to the present invention comprises a plurality of glass plates and the above coconut husk powder which is dispersed or spread on the glass plates by a conventional dispersing apparatus wherein the glass plates are then stacked. There is no particular limitation on the thickness and the dimension of the glass plates to be stacked.

An amount of the coconut husk powder on the plate is dependent upon the storage term and the storage condition of the stack of glass plates, but normally preferably of 1.0–5.0 g/m$^2$ to the surface area of the glass plates.

EXAMPLES

The present invention will be described in detail by employing examples, comparative examples, and reference examples.

Examples 1–8, Comparative Example 1

Powder was made by grinding outer husks of coconuts in which seeds are completely removed. The powder has an average particle size of about 90 μm. The content of particles having a particle size of 125 μm or less is 70%. 99% of the particles pass through a 200-mesh sieve. The powder was washed by immersing the powder in water at 5% of the concentration of water washing and agitating them and was dried by dewatering and heated-air drying. In this manner, each coconut husk powder was obtained, pH of which is 7. The moisture content and the fats and oils content are shown in Table 1.

Each coconut husk powder thus obtained was uniformly dispersed or spread on a glass plate cut in a certain size and another glass plate is laid on the glass plate to form a stack of the glass plates.

The friction coefficients of the stacked glass plates were measured by the following method and the results arc shown in Table 1.

The sticking property of each coconut husk powder to the glass plate and the removability of each coconut husk powder from the glass plate were also measured by the following method and the results are also shown in Table 1.

Method of Measuring the Friction Coefficient

Each sample was horizontally laid on a test bench and a tilt angle of the test bench was gradually increased with only the lower glass plate being held. The friction coefficient was measured according to the angle where the upper glass plate started to slide down. This test was repeated at five times and the average was found.

Sticking Property to the Glass Plate

After the stack of the glass plates was vertically stood, the residual ratio of powder between the glass plates relative to the original amount of the dispersed powder was measured.

Removability by Brushing from the Glass Plate

After brushing the surface of the glass plate where the powder was dispersed, the residual ratio of the powder per an unit area was measured.

Comparative Examples 2–4

The same powders as Comparative Example 1 but without washing were employed as coconut husk powder, and the friction coefficient, the sticking property and the removability of the powders were measured in the same manner as Example 1 and the results are shown in Table 1.

Comparative Example 5

Instead of the coconut husk powder, safflower powder in which average particle size 170 μm was employed, and the friction coefficient, the sticking property and the removability of the powder were measured in the same manner as Example 1 and the results are shown in Table 1.

TABLE 1

| | | CONTENTS IN COCONUT HUSK POWDER (wt%) | | FRICTION COEFFICIENT NUMBER OF MEASUREMENTS | | | | | | STICKING PROPERTY OF POWDER (%) | REMOVABILITY OF THE POWDER BY BRUSHING | REMARKS |
|---|---|---|---|---|---|---|---|---|---|---|---|---|
| | | MOISTURE | FAT AND OIL | 1 | 2 | 3 | 4 | 5 | AVERAGE | | | |
| EXAMPLES | 1 | 2.9 | 0.22 | 0.28 | 0.32 | 0.29 | 0.31 | 0.30 | 0.30 | 23.0 | GOOD | |
| | 2 | 6.0 | 0.24 | 0.26 | 0.24 | 0.26 | 0.26 | 0.26 | 0.26 | 23.0 | GOOD | |
| | 3 | 8.0 | 0.34 | 0.27 | 0.29 | 0.26 | 0.25 | 0.24 | 0.26 | 23.0 | GOOD | |
| | 4 | 2.4 | 0.90 | 0.24 | 0.26 | 0.23 | 0.29 | 0.27 | 0.26 | 23.0 | GOOD | |
| | 5 | 3.6 | 0.97 | 0.28 | 0.22 | 0.30 | 0.27 | 0.26 | 0.26 | 23.0 | GOOD | |
| | 6 | 9.6 | 0.93 | 0.24 | 0.24 | 0.22 | 0.28 | 0.21 | 0.24 | 23.0 | GOOD | |
| | 7 | 6.6 | 0.76 | 0.27 | 0.27 | 0.24 | 0.23 | 0.26 | 0.25 | 23.0 | GOOD | |
| | 8 | 4.9 | 0.82 | 0.24 | 0.25 | 0.22 | 0.26 | 0.28 | 0.25 | 23.0 | GOOD | |
| COMPARATIVE EXAMPLES | 1 | 14.5 | 0.67 | 0.21 | 0.20 | 0.19 | 0.19 | 0.17 | 0.19 | 23.0 | GOOD | WASHED |
| | 2 | 10.0 | 0.99 | 0.16 | 0.19 | 0.17 | 0.14 | 0.20 | 0.17 | 23.0 | GOOD | UNWASHED |
| | 3 | 7.5 | 0.21 | 0.19 | 0.21 | 0.20 | 0.20 | 0.21 | 0.21 | 23.0 | GOOD | UNWASHED |
| | 4 | 5.4 | 0.82 | 0.17 | 0.17 | 0.15 | 0.15 | 0.16 | 0.16 | 23.0 | GOOD | UNWASHED |
| | 5 | 5.0 | 0.90 | 0.09 | 0.10 | 0.11 | 0.11 | 0.10 | 0.10 | 11.0 | BAD | SAFFLOWER |

It is apparent from Table 1 that, with the coconut husk powders (Examples 1–8) in which the moisture content is 10% by weight or less and the fats and oils content is 1.0% by weight or less, the friction coefficient is held in 0.24 or more for a long term and, in addition, the sticking property to the glass plate and the removability from the glass plate are both good.

Examples 9–12, Comparative Examples 6, 7

Comparative Example 3 was washed by water and dried under the same condition as Example 1 to obtain coconut husk powders (Examples 9, 10, 11, 12) having moisture content and fats and oils content specified in Table 2. With using these powders, the friction coefficients, the sticking properties and the removablitys of the powders were measured in the same manner as Example 1 and the results are shown in Table 2.

It is clear that Examples 9, 10 have friction coefficients significantly larger than that of Comparative Example 3 because these were washed and dried.

Example 11 was further decreased in the fats and oils content as compared to Example 10. As a result of this, Example 11 has a friction coefficient larger than that of Example 10.

Example 12 was further decreased in the moisture content as compared to Example 11. As a result of this, Example 12 has a friction coefficient larger than that of Example 11.

For comparison, the friction coefficients, the sticking properties and the removabilities of the coconut husk powders which were not washed are also shown in Table 2 as Comparative Examples 6, 7 as well as the result of Comparative Example 3.

TABLE 2

| EXAMPLES | CONTENTS IN COCONUT HUSK POWDER (wt%) | | FRICTION COEFFICIENT | REMOVABILITY OF THE POWDER BY BRUSHING | REMARK |
|---|---|---|---|---|---|
| | MOISTURE | FAT AND OIL | | | |
| EXAMPLE 9 | 7.5 | 0.20 | 0.27 | GOOD | WASHED POWDER |
| EXAMPLE 10 | 7.8 | 0.22 | 0.26 | GOOD | WASHED POWDER |
| EXAMPLE 11 | 7.8 | 0.06 | OVER 0.29 | GOOD | WASHED POWDER |
| EXAMPLE 12 | 2.0 | 0.06 | 0.32 | GOOD | WASHED POWDER |
| COMPARATIVE EXAMPLE 3 | 7.5 | 0.21 | 0.21 | GOOD | WASHED POWDER |
| COMPARATIVE EXAMPLE 6 | 5.0 | 0.30 | 0.18 | GOOD | UNWASHED POWDER |
| COMPARATIVE EXAMPLE 7 | 2.0 | 0.50 | 0.18 | GOOD | UNWASHED POWDER |

It is apparent from Table 2 that the friction coefficient becomes 0.24 or more by adjusting the fats and oils content and the moisture content of the coconut husk power by water washing and drying.

Industrial Applicability

As described above, the cushion spacer for glass plates of the present invention functions enough as a spacer because the powder securely sticks to the glass plate and also holds the glass plates in the state of being difficult to slip from each other, thereby securely preventing the glass plates from scratching due to contact between the glass plates and preventing loads from shifting. The occurrence of discoloring due to the powder to the glass plate is also prevented. In addition, the cushion spacer for glass plates of the present invention is easily dispersed on the glass plate and easily removed from the glass plate, thereby offering handling ease.

The stack of glass plates of the present invention using the cushion spacer of the present invention offers excellent handling, particularly when stacked horizontally, and offers excellent long-term storage, without problem of scratching and deterioration of glass during transportation and storage.

What is claimed is:

1. A cushion spacer made of coconut husk powder interposed between glass plates,
   wherein the coconut husk powder is washed by water and then dried, and
   wherein the spacer is adjusted such that a moisture content of the powder is 10% by weight or less and fats and oils content of the powder is 1.0% by weight or less.

2. A cushion spacer according to claim 1, wherein the coconut husk powder is composed of particles in such a manner that 95% or more of the particles pass through a 200-mesh sieve.

3. A cushion spacer according to claim 1, wherein said powder is washed by immersing the coconut husk powder in water, and wherein a ratio of a coconut husk powder to the water for washing is 5% by weight or less.

4. A cushion spacer according to claim 3, wherein the ratio of the coconut husk powder to the water is 3–5% by weight.

5. A cushion spacer according to claim 1, wherein a friction coefficient is 0.25 or more.

6. A cushion spacer according to claim 1, wherein the moisture content of the coconut husk powder is 8% by weight or less and the fats and oils content of the coconut husk powder is 0.5% by weight or less.

7. A cushion spacer according to claim 1, wherein an average particle size of the coconut husk powder is in a range between 60 $\mu$m and 120 $\mu$m and wherein 50 wt % or more of the coconut husk powder has a particle size between 50 $\mu$m and 130 $\mu$m.

8. A cushion spacer according to claim 1, wherein pH of the coconut husk powder is between 6 and 7.

9. A cushion spacer according to claim 1, wherein said coconut husk powder is a water-washed and dried coconut husk powder.

10. A cushion spacer to be disposed between glass plates, comprising washed and dried coconut husk powder having a moisture content of 10% by weight or less, a fat and oil content of 1.0% by weight or less so that when the washed and dried coconut husk powder is disposed between the glass plates, a friction coefficient between the glass plates becomes 0.24 or more, and an average particle size in a range between 60 $\mu$m and 120 $\mu$m, 50 wt % or more of the coconut husk powder having a particle size between 50 $\mu$m and 130 $\mu$m.

11. A stack of glass plates comprising glass plates, and a cushion spacer disposed between the glass plates, said cushion spacer being made of washed and dried coconut husk powder having a moisture content of 10% by weight or less, a fat and oil content of 1.0% by weight or less, and a friction coefficient between the glass plates of 0.24 or more.

12. A stack of glass plates according to claim 11, wherein said coconut husk powder has an average particle size in a range between 60 $\mu$m and 120 $\mu$m, 50 wt % or more of the coconut husk powder having a particle size between 50 $\mu$m and 130 $\mu$m, and pH between 6 and 7.

13. A stack of glass plates according to claim 11, wherein the cushion spacer is applied by 1.0–5.0 g/m$^2$ to the surface area of a glass plates.

* * * * *